United States Patent Office 3,170,890
Patented Feb. 23, 1965

3,170,890
POWDERS FOR FUSION COATING COMPRISING AN EPOXIDE RESIN, A SILOXANE RESIN, AN ACID ANHYDRIDE AND FILLERS
Gerald C. Boyd and Harold L. Vincent, Midland, Mich., assignors to Dow Corning Corporation, Midland, Mich., a corporation of Michigan
No Drawing. Filed Aug. 24, 1961, Ser. No. 133,561
1 Claim. (Cl. 260—37)

This invention relates to silicone epoxide compositions in powdered form suitable for use in coating solid surfaces.

The use of epoxide resins as coating compositions is known but the previously employed epoxide resin compositions have suffered from several disadvantages when employed in the form of powders suitable for coating solid objects. In general, these powders were employed in a fluidized form and the object is immersed in the fluidized powder. The heat of the object causes the powder to coalesce on the surface of the object and there fuse into a protective film. In the past, epoxide resin coating powders have suffered from the disadvantage that for many applications they required more than one application of the powder to obtain a sufficiently good coating. This was particularly true when the coating was for the purpose of electrical insulation. A second disadvantage of previously known epoxide coating compositions has been the inability to employ large amounts of filler and still obtain useful compositions. Thus these coatings were expensive.

It is also known that epoxides could be reacted with organosilicon compositions in order to obtain copolymers having various desirable properties. However, it is heretofore been unknown that suitable coating powders could be made from mixtures of epoxide resins and organosiloxane resins.

It is the object of this invention to provide silicone-epoxide resin powders which are suitable for coating solid surfaces so that the coatings have better high temperature properties, better electrical properties, better color retention and lower weight loss at elevated temperatures than the epoxide powder coating compositions previously known. Another object is to provide a powder coating composition which requires only one application to the surface in order to give excellent electrical properties. Another object is to provide an epoxide coating powder of reduced price due to the fact that large amounts of filler can be incorporated into the system. Other objects and advantages will be apparent from the following description.

This invention relates to a free flowing powder suitable for fusion coating of solid surfaces consisting essentially of (A) from 40 to 75 percent by weight of a mixture of (1) from 40 to 99.5 percent by weight of an epoxide resin consisting essentially of a condensation product of epichlorohydrin and a bis(p - hydroxyphenyl)dimethylmethane, (2) from .5 to 60 percent by weight based on the combined weights of (1) and (2) of a siloxane resin having on the average from 1 to 1.7 monovalent hydrocarbon radicals per silicon atom of which hydrocarbon radicals at least 10 percent by nummer are phenyl and (3) an anhydride of a polycarboxylic acid, said anhydride having a melting point of at least 100° C. and said anhydride being present in amount such that there is from .4 to 1.4 anhydride equivalent weight per epoxide equivalent weight of the epoxy resin and (B) from 25 to 70 percent by weight of filler based on the combined weights of (A) and (B).

The compositions of this invention are best prepared by mixing the epoxide resin and the siloxane resin and the filler in any suitable manner such as by milling. In carrying out the mixing operation, the resins are heated to plasticize them in order to aid in the mixing of the filler. After the filler has been thoroughly mixed in, the anhydride catalyst is then added and the mixing is continued until an uniform mix is obtained. The mixed composition can then be ground into a powder of the desired size in hammer mills or in other suitable apparatus. In carrying out this process, it is desirable that the mixing operation be as short as possible after the catalyst has been added and that the mixture be cooled immediately after mixing is complete in order to minimize the chance of premature gelation of the composition.

The products of this invention are stable in storage and can be used to coat solid articles in any suitable fashion. One way is to fluidize the powder by passing a stream of gas through a bed thereof. The article to be coated is then heated to a temperature of about 175° C. and then immersed in the fluidized powder for a short time, that is 1 to 10 seconds. These conditions generally give satisfactory coatings, although higher or lower temperatures and longer immersion times can be employed if desired. Obviously, the temperature of the articles must be above the fusion temperature of the powder.

If desired, the powder can be applied to the surface of the article by any other suitable method. These include for example pouring the powder on the surface of the hot article or spraying the powder against the surface of the article or by brushing the powder on the surface of the article.

The epoxide resins employed in this invention are condensation products of epichlorohydrin and a bis(p-hydroxyphenyl)dimethylmethane, such as bis(p-hydroxyphenyl)dimethylmethane or halogenated derivatives thereof such as, bis-chloroparahydroxyphenyldimethylmethane or bis-tetrabromoparahydroxyphenyldimethylmethane. These products are well-known articles of commerce and they vary in molecular weight from resins having epoxide equivalent weights of 100 to 4,000 or more. The term epoxide equivalent weight refers to the grams of resin containing 1 gram equivalent of epoxide group. Thus, the higher the epoxide equivalent, the higher the molecular weight of the resin.

The physical property of the epoxide resin is immaterial provided it is capable of being mixed with sufficient filler and siloxane to give a free flowing powder.

The siloxanes employed in this invention are resinous compositions containing on the average from 1 to 1.7 monovalent hydrocarbon groups per silicon atom. At least 10 percent by number of these hydrocarbon groups must be phenyl in order for the resin to be suitable for the purposes of this invention. Thus it can be seen that the siloxane resins suitable for this invention can be, for example, monophenylsiloxane; copolymers of monophenylsiloxane and diphenylsiloxane; copolymers of monophenylsiloxane and phenylmethylsiloxane and copolymers of monophenylsiloxane with phenylethylsiloxane. The siloxane can also be copolymers of phenylsiloxanes with limited amounts of other hydrocarbon-substituted siloxanes.

Thus, for example, a siloxane can be copolymers of monophenylsiloxane and monopropylsiloxane; copolymers of monomethylsiloxane and phenylmethylsiloxane; copolymers of monophenylsiloxane, monomethylsiloxane, diphenylsiloxane and phenylmethylsiloxane; copolymers of monomethylsiloxane, monopropylsiloxane and monophenylsiloxane and copolymers of monamylsiloxane, diphenylsiloxane and monomethylsiloxane. Preferably, the hydrocarbon groups should contain not more than 7 carbon atoms.

The siloxane resins employed in this invention can be prepared in any of the conventional ways for preparing such resins which resins are well-known articles of commerce.

For the purpose of this invention, the catalyst employed to cure the mixture of siloxane and epoxide resin are anhydrides of polycarboxylic acids having at least two carboxyl groups per molecule. The anhydrides are critical ingredients of the compositions of this invention and must have a melting point of at least 100° C. If desired, two or more anhydrides may be employed in any one composition. Specific examples of operative anhydrides are succinic anhydride, phthalic anhydride, pyromellitic dianhydride, tetrachlorophthalic anhydride, trimellitic monoanhydride, hexachloroendomethylene-tetrahydrophthalic anhydride and naphthalenedicarboxylic acid anhydride.

Thus, it can be seen that the anhydrides employed in this invention can be derived from aliphatic, cycloaliphatic or aromatic carboxylic acids and that they can be halogenated derivatives of these materials.

For the purpose of this invention, the anhydride should be employed in amount of from .4 to 1.4 anhydride equivalents per epoxy equivalent in the epoxy resin. The term anhydride equivalent refers to the equivalent weight of the anhydride based upon the number of anhydride groups per molecule. Thus the anhydride equivalent of phthalic anhydride is equal to the molecular weight, while the anhydride equivalent of pyromellitic dianhydride is ½ the molecular weight. Any carboxyl groups are counted as ½ an anhydride group. Thus, the anhydride equivalent of trimellitic monoanhydride

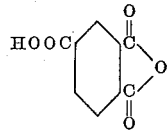

is the molecular weight divided by 1.5.

The final critical ingredient of the compositions of this invention is the filler, which is employed in amount of from 25 to 70 parts by weight, based on the total weight of the epoxide resin, the siloxane resin and the anhydride employed. For the purpose of this invention, the filler can be any heat stable inorganic or organic material such as phthalcyanins; metal oxides such as antimony oxide, titania, alumina, ferric oxide or zirconia, siliceous materials such as amorphous or crystalline forms of silica, such as diatomaceous earth, fume silica, crushed quartz, silica xerogels or sand; silicates such as aluminum silicate, magnesium silicate, zirconium silicate, magnesium aluminum silicates and calcium aluminum silicates; carbonaceous fillers such as graphite and carbon black; and powdered metals such as aluminum, iron, copper and zinc.

The choice of filler will depend upon the use to which the coated article is to be put. In those cases in which flame retardance is important, antimony oxide is a desirable filler and should be used together with a halogen containing anhydride and/or a halogen containing epoxy resin. For best electrical properties, dielectric fillers such as the metal oxides or various forms of silica are best employed. However, if one desires conductive coatings or decorative coatings, then powdered materials such as graphite or other semiconducting or pigment materials can be employed.

In addition to the above critical ingredients, the compositions of this invention may contain other minor additives such as oxidation inhibitors, coloring agents, plasticizers and other additives normally employed in coating compositions.

The following examples are illustrative only and should not be construed as limiting the invention which is properly delineated in the appended claims. All parts are parts by weight.

*Example 1*

75 parts of a condensation product of epichlorohydrin and bis(p-hydroxyphenyl)dimethylmethane having an epoxide equivalent weight of 475 was milled with 25 parts of a copolymer of 70 mol percent monophenylsiloxane and 30 mol percent monopropylsiloxane, 125 parts of talc and 15 parts of pyromellitic dianhydride. The resulting mixture was cooled and ground into a powder on a hammer mill. The resulting product was a free flowing powder which gave excellent coating and good edge coverage on aluminum panels when the latter were heated to 175° C. and immersed in a fluid bed of the powder for 1 to 10 seconds.

The coated panels withstood 12 cycles in the thermal shock test and the coating had a craze-life of 1,250 hours at 200° C. The adhesion of the coating was excellent and the weight loss was 7.6 percent after 100 hours at 250° C.

The shelf life of the powder was greater than three months.

The thermal shock test employed in this and the following examples was run as follows. A 20 mil coating of the composition on a 1 x 4 x 1/16 inch steel panel was heated to 175° C. and then immediately cooled in a Dry Ice isopropanol bath (−75±2° C.). This constitutes one cycle and the cycles are repeated until crazing of the coating is noted.

*Example 2*

75 parts of a condensation product of epichlorohydrin and bis(p-hydroxphenyl)dimethylmethane having an epoxide equivalent of 550 was milled with 25 parts of a copolymer of 70 mol percent monophenylsiloxane and 30 mol percent monopropysiloxane, 150 parts of talc and 12 parts of pyromellitic dianhydride. The resulting product was powdered in a hammer mill and the free flowing powder gave excellent coating on aluminum and steel panels. The adhesion was excellent.

*Example 3*

75 parts of a condensation product of epichlorohydrin and bis(p-hydroxyphenyl)dimethylmethane having an epoxide equivalent of 925 was milled with 25 parts of the siloxane of Example 2, 65 parts, talc; 35 parts, alumina; 3.7 parts of pyromellitic dianhydride and 5 parts of phthalic anhydride. The mixture was cooled and powdered to give a free flowing powder which gives excellent gloss, smoothness and flow out when coated on aluminum panels in the fluid bed process as shown in Example 1.

*Example 4*

75 parts of a condensation product of epichlorohydrin and bis(p-hydroxyphenyl)dimethylmethane having an epoxide equivalent of 1800 was milled with 25 parts of the siloxane of Example 2, 40 parts, talc; 20 parts, alumina; 1.9 parts, pyromellitic dianhydride and 2.6 parts of phthalic anhydride. The resulting product was powdered and free flowing powder which gave excellent coatings on aluminum and steel was obtained.

*Example 5*

17 parts of a condensation product of epichlorohydrin with a mixture of bis(p-hydrophenyl)dimethylmethane and bis(p-hydroxytetrabromophenyl)dimethylmethane, said condensation product containing 20 per cent by weight bromine and having an epoxide equivalent weight of 476 was milled with 58 parts of a condensation product of epichlorohydrin and bis(p-hydroxyphenyl)dimethylmethane having an epoxide equivalent of 925, 25 parts of the siloxane of Example 2, 92 parts of ground quartz, 15 parts of antimony oxide, .7 part of a maroon pigment and 10.6 parts of trimellitic monoanhydride.

The resulting product was cooled and powdered on a hammer mill to give a free flowing powder which coats well on aluminum panels by the fluid bed process of Example 1. The coating had excellent adhesion, a craze-life greater than 300 hours at greater than 200° C. and a flame retardance of 1.4 seconds.

The flame retardance is measured by coating an article with the powder, inserting the article in a gas flame two inches high with a cone one inch high for 10 seconds and then removing the article from the flame and measuring the time required for the flame to go out. The time for the coating to extinguish itself is the flame retardance.

*Example 6*

75 parts of a condensation product of epichlorohydrin and bis(p-hydroxyphenyl)dimethylmethane having an epoxy equivalent of 925 was milled with 25 parts of a copolymer of 31.33 mol percent phenylmethylsiloxane, 31.33 mol percent monophenylsiloxane, 31.34 mol percent monomethylsiloxane and 6 mol percent diphenylsiloxane, 100 parts alumina, 10 parts ferric oxide and 9 parts trimellitic monoanhydride. The resulting product was cooled and powdered on a hammer mill to give a free flowing powder which gave excellent coatings on aluminum and steel and which showed excellent color retention at 200° C.

*Example 7*

75 parts of the epoxide resin of Example 6 was milled with 25 parts of a copolymer of 45 mol percent monomethylsiloxane, 40 mol percent monophenylsiloxane, 5 mol percent phenylmethylsiloxane and 10 mol percent diphenylsiloxane, 25 parts alumina, 37.5 parts talc, 3.7 parts pyromellitic dianhydride, 5 parts phthalic anhydride and 1 part dicyandiamide. The resulting product was powdered on a hammer mill to give a free flowing powder which gave excellent coatings on aluminum and steel. The craze-life of these coatings was greater than 460 hours at 250° C. and the shelf life of the powder was greater than 10 months.

*Example 8*

75 parts of the epoxide resin of Example 6 was milled with 25 parts of the siloxane of Example 1, 7.5 parts of a copolymer of 55 mol percent phenylmethylsiloxane, 30 mol percent monomethylsiloxane and 15 mol percent monophenylsiloxane, 55 parts talc, 35 parts alumina, 5 parts ferric oxide, 15 parts antimony oxide and 30 parts of hexachloroendomethylenetetrahydrophthalic anhydride. The product was cooled and powdered on a hammer mill. This material was coated on aluminum panel and gave an excellent coating having a flame retardance of zero and gave excellent coating in one dip in the fluid bed process of Example 1.

*Example 9*

50 parts of the epoxide resin of Example 6 was milled with 50 parts of a siloxane resin of Example 1, 80 parts of crush quartz, 2.2 parts of a blue pigment and 6.9 parts of trimellitic monoanhydride. The product was powdered on a hammer mill and coated on aluminum. It gave excellent adhesion, good flow out, excellent gloss and withstood more than 10 cycles in the thermal shock test.

*Example 10*

75 parts of the epoxide resin of Example 6 was milled with 25 parts of a siloxane of Example 1, 65 parts talc, 35 parts alumina, 3.7 parts pyromellitic dianhydride and 5 parts of phthalic anhydride. The material was powdered and the powder was a free flowing material which gave excellent adhesion, gloss and coating properties on aluminum and steel.

*Example 11*

75 parts of the epoxide resin of Example 6, 25 parts of a siloxane resin of Example 1 were milled with 100 parts crush quartz, 9 parts antimony oxide, 2 parts of a blue pigment, 22 parts of hexachloroendomethylenetetrahyrophthalic anhydride and 2.4 parts succinic anhydride. The resulting powder gave excellent coating on aluminum and steel. The flame retardance was .4 second.

*Example 12*

75 parts of the epoxide resin of Example 6 was milled with 25 parts of a siloxane resin of Example 1, 100 parts crush quartz, 5 parts iron oxide, 9 parts antimony oxide and 22.4 parts of hexachloroendomethylenetetrahydrophthalic anhydride. The resulting powder gave good coating on aluminum panel. The coating had a flame retardance of .6 second and a craze-life of 600 to 700 hours at 200° C.

*Example 13*

75 parts of the epoxide resin of Example 6 was milled with 25 parts of siloxane resin of Example 1, 55 parts talc, 35 parts alumina, 10 parts iron oxide, 7.3 parts antimony oxide, 18.5 parts of hexachloroendomethylenetetrahydrophthalic anhydride and 10.3 parts of tetrachlorophthalic anhydride. The resulting powder was a free flowing material which gave excellent coatings on metal and had a flame retardance of .5 second.

*Example 14*

75 parts of the epoxide resin of Example 6 was milled with 25 parts of siloxane resin of Example 1, 90 parts Ottawa sand, 3.7 parts pyromellitic dianhydride and 5 parts phthalic anhydride. The powdered material was free flowing and gave excellent coating on metal surfaces. The shelf life of the powder was greater than eight months.

*Example 15*

75 parts of the epoxy resin of Example 6 was milled with 25 parts of the siloxane resin of Example 1, 35 parts alumina, 30 parts talc, 33 parts antimony oxide, 3.7 parts pyromellitic dianhydride and 5 parts phthalic anhydride. The resulting powder gave excellent coatings on metal surfaces and had a shelf life greater than eight months.

*Example 16*

75 parts of the epoxide resin of Example 6 was milled with 25 parts of the siloxane resin of Example 1, 25 parts talc, 75 parts $TiO_2$, 3.7 parts pyromellitic dianhydride and 5 parts phthalic anhydride. The powder composition gave excellent coating on metal surfaces.

*Example 17*

75 parts of the epoxide resin of Example 6 was milled with 25 parts of the siloxane resin of Example 1, 150 parts alumina, 3.7 parts pyromellitic dianhydride, 5 parts phthalic anhydride and 1 part dicyandiamide. The resulting powder gave excellent coatings on metal surfaces.

*Example 18*

75 parts of the epoxide resin of Example 6 was milled with 25 parts of the siloxane resin of Example 1, 55 parts talc, 35 parts alumina, 10 parts iron oxide, 7.5 parts antimony oxide, 15 parts of hexachloroendomethylenetetrahydrophthalic anhydride, 11.9 parts of tetrachlorophthalic anhydride and 5 parts of a chlorinated diphenyl-ether plasticizer. The resulting powder gave excellent coating on metal and had a flame retardance of 1.2 seconds.

*Example 19*

Equivalent coatings are obtained when the compositions of this invention are applied to glass, ceramic and copper articles.

*Example 20*

Good coatings are obtained when 150 parts of the epoxide resin of Example 4 is milled with 25 parts of a copolymer of 25 mol percent monomethylsiloxane, 35 mol percent monophenylsiloxane, 20 mol percent dimethylsiloxane and 20 mol percent diphenylsiloxane, 100 parts alumina, 10 parts iron oxide and 9 parts trimellitic monoanhydride and the resulting product is powdered on a hammer mill and then coated on steel articles by the fluid bed process of Example 1.

That which is claimed is:

A free flowing powder suitable for fusion coating of solid surfaces consisting essentially of (A) from 40 to 75 percent by weight of a mixture of (1) from 40 to 99.5 percent by weight of an epoxy resin consisting essentially of a condensation product of epichlorohydrin and a bis(p-hydroxyphenyl)dimethylmethane, (2) from .5 to 60 percent by weight based on the combined weights of (1) and (2) of a siloxane resin having on the average from 1 to 1.7 monovalent hydrocarbon radicals per silicon atom of which monovalent hydrocarbon radicals at least 10 percent by number are phenyl and (3) an anhydride of a polycarboxylic acid, said anhydride having a melting point of at least 100° C. and said anhydride being present in amount such that there is from .4 to 1.4 anhydride equivalent weights per epoxide equivalent weight of the epoxy resin and (B) from 25 to 70 percent by weight of filler based on the combined weights of (A) and (B).

References Cited in the file of this patent

UNITED STATES PATENTS

| | | |
|---|---|---|
| 3,028,251 | Nagel | Apr. 3, 1962 |
| 3,055,858 | Frye et al. | Sept. 25, 1962 |

FOREIGN PATENTS

| | | |
|---|---|---|
| 202,627 | Australia | July 20, 1956 |
| 212,546 | Australia | Feb. 8, 1958 |

OTHER REFERENCES

1959 Guide Dow Corning Silicones, Reference Number 1–114, page 8.

UNITED STATES PATENT OFFICE
CERTIFICATE OF CORRECTION

Patent No. 3,170,890                      February 23, 1965

Gerald C. Boyd et al.

It is hereby certified that error appears in the above numbered patent requiring correction and that the said Letters Patent should read as corrected below.

In the heading to the printed specification, line 4, for "FILTERS" read -- FILLERS --; column 4, line 64, for "bis(p-hydrophenyl)" read -- bis(p-hydroxyphenyl) --.

Signed and sealed this 10th day of August 1965.

(SEAL)
Attest:

ERNEST W. SWIDER                      EDWARD J. BRENNER
Attesting Officer                      Commissioner of Patents